(12) United States Patent
Nishihara

(10) Patent No.: US 6,456,702 B2
(45) Date of Patent: Sep. 24, 2002

(54) CLOCK ADJUSTMENT METHOD AND APPARATUS

(75) Inventor: Kaneyuki Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/767,963

(22) Filed: Jan. 24, 2001

(30) Foreign Application Priority Data

Jan. 26, 2000 (JP) ........................................ 2000-016701

(51) Int. Cl.[7] ............................................. H04M 11/00

(52) U.S. Cl. ................................ 379/93.05; 379/90.01; 379/93.14

(58) Field of Search .......................... 379/90.01, 93.01, 379/93.05–93.08, 93.14, 93.15, 93.26, 93.28

(56) References Cited

U.S. PATENT DOCUMENTS 5,812,644 A * 9/1998 Bowater et al. ......... 379/93.14

* cited by examiner

Primary Examiner—Wing Chan
(74) Attorney, Agent, or Firm—McGinn & Gibb, PLLC

(57) ABSTRACT

An apparatus (and method) for connecting a first network and a second network operating at different clock frequencies to transfer data between them, includes a first interface to the first network, a second interface to the second network, a buffer memory connected to the first interface for storing data to be transferred, a clock converter connected between the buffer memory and the second interface performing a clock conversion according to a controlled clock signal corresponding to the first network and an extracted clock signal from the second network, a buffer monitor for monitoring an amount of data stored in the buffer memory and producing a buffer status signal, and a clock adjuster for adjusting the controlled clock signal depending on the buffer status signal.

22 Claims, 2 Drawing Sheets

| STATUS OF FIFO | | | | CONTROLLED CLOCK OUTPUT FROM CLOCK GENERATION SWITCH 17 |
|---|---|---|---|---|
| 101 | 102 | 103 | 104 | |
| EMPTY | EMPTY | FULL | FULL | START WITH NORMAL-SPEED CLOCK |
| EMPTY | EMPTY | EMPTY | FULL | SWITCH TO LOWER-SPEED CLOCK |
| EMPTY | FULL | FULL | FULL | SWITCH TO HIGHER-SPEED CLOCK |
| EMPTY | EMPTY | FULL | FULL | SWITCH TO NORMAL-SPEED CLOCK |

FIG. 2

| STATUS OF FIFO | | | | CONTROLLED CLOCK OUTPUT FROM CLOCK GENERATION SWITCH 17 |
|---|---|---|---|---|
| 201 | 202 | 203 | 204 | |
| FULL | FULL | EMPTY | EMPTY | START WITH NORMAL-SPEED CLOCK |
| FULL | EMPTY | EMPTY | EMPTY | SWITCH TO HIGHER-SPEED CLOCK |
| FULL | FULL | FULL | EMPTY | SWITCH TO LOWER-SPEED CLOCK |
| FULL | FULL | EMPTY | EMPTY | SWITCH TO NORMAL-SPEED CLOCK |

FIG. 3

CLOCK ADJUSTMENT METHOD AND APPARATUS

BACKGROUND OF THE INVENTION

1. Field of the Invention

The present invention relates to a technique allowing communications between a computer and a network such as a switched telephone network.

2. Description of the Related Art

With the widespread use of personal computers (PCs), the demands for voice communication between personal computers through a telephone network are growing. Conventionally, voice data communication is performed using telephone terminal equipment connecting a personal computer to the telephone network. More specifically, the telephone terminal equipment is provided with a phase-locked loop circuit that is used to synchronize to a clock signal extracted from the telephone network.

It is necessary to synchronize all devices connected to the same communication line and therefore the USB (universal serial bus) interface is used to synchronize the clock of a PC to the clock signal extracted from the telephone network. However, the clock of a PC cannot be controlled from outside. Accordingly, it is difficult or almost impossible to establish synchronization of a PC.

When clock synchronization is not perfectly established, the clock of a PC that is used to digitize a voice signal and the transmission clock of the telephone network are independently running. In the case where the PC clock frequency is higher than the transmission clock frequency of the telephone network, the digital signal generated by the PC cannot be transmitted to the telephone network. Contrarily, when the PC clock frequency is lower than the transmission clock frequency of the telephone network, data to be transmitted to the telephone network is partly lost, which causes noise due to slips of voice data.

SUMMARY OF THE INVENTION

An object of the present invention is to provide a clock adjustment method and apparatus allowing stable and reliable voice communication between a computer and a network without generating noise due to slips of voice data.

According to an aspect of the present invention, an apparatus connecting a first network and a second network to transfer data between them, wherein the first and second networks operate at different clock frequencies, respectively, includes: a first interface to the first network; a second interface to the second network; a buffer memory connected to the first interface, for storing data to be transferred to one of the first and second networks; a clock converter connected between the buffer memory and the second interface, performing a clock conversion according to a controlled clock signal corresponding to the first network and an extracted clock signal that is extracted from the second network; a buffer monitor for monitoring an amount of data stored in the buffer memory to produce a buffer status signal; and a clock adjuster for adjusting the controlled clock signal depending on the buffer status signal.

The clock adjuster may change a frequency of the controlled clock signal so that the amount of data stored in the buffer memory is kept at a predetermined level. The clock adjuster may change a frequency of the controlled clock signal by an amount within a permissible frame clock error which may occur in the first interface.

According to another aspect of the present invention, an apparatus includes: a USB (universal serial bus) interface to a USB bus connected to the personal computer; a network interface to the switched telephone network; a transmission buffer memory for storing transmission digital voice data that the personal computer transmits; a reception buffer memory for storing reception digital voice data received from the switched telephone network via the network interface; a PCM modulator for modulating the transmission digital voice data to produce a transmission PCM signal; a PCM demodulator for demodulating a reception PCM signal to produce the reception digital voice data; a transmission clock converter connecting the PCM modulator to the network interface, performing a clock conversion according to a controlled clock signal corresponding to the USB interface and an extracted clock signal that is extracted from the second network; a reception clock converter connecting the network interface to the PCM demodulator, performing a clock conversion according to the controlled clock signal and the extracted clock signal; a buffer monitor for monitoring an amount of data stored in each of the transmission and reception buffer memories to produce a buffer status signal; and a clock switching controller for switching a frequency of the controlled clock signal to one selected from a plurality of predetermined frequencies depending on the buffer status signal.

The clock switching controller may switch a frequency of the controlled clock signal so that the amount of data stored in the buffer memory is kept at a predetermined level. The plurality of predetermined frequencies may be a normal frequency, a lower frequency, and a higher frequency, wherein a difference between each of the lower and higher frequencies and the normal frequency falls into a range within a permissible frame clock error which may occur in the USB interface. The permissible frame clock error may be 5% of a normal frame clock of the USB bus.

The transmission clock converter may include: a first coder for coding the transmission PCM signal to produce a transmission analog voice signal according to the controlled clock signal; and a first decoder for decoding the transmission analog voice signal to produce network-side transmission PCM signal according to the extracted clock signal. The reception clock converter may include: a second coder for coding network-side reception PCM signal to produce a network-side reception analog voice signal according to the extracted clock signal; and a second decoder for decoding the network-side reception analog voice signal to produce the reception PCM signal according to the controlled clock signal.

The digital voice data may be transferred through the USB bus in an isochronous mode.

The transmission buffer memory and the reception buffer memory may be FIFO (first-in-first-out) memories, respectively.

The transmission buffer memory may include a plurality of FIFO memories and the reception buffer memory comprises a plurality of FIFO memories.

A control method for a telephone terminal connecting a personal computer and a switched telephone network to transfer voice data between them, includes the steps of: storing digital voice data to be transferred to one of the personal computer and the switched telephone network in a buffer memory; monitoring an amount of data stored in the buffer memory to produce a buffer status signal; adjusting a frequency of a controlled clock signal corresponding to the personal computer depending on the buffer status signal; extracting an extracted clock signal from the switched telephone network; and converting an operation clock between the personal computer and the switched telephone network according to the controlled clock signal and the extracted clock signal.

BRIEF DESCRIPTION OF THE DRAWINGS

FIG. 2 is a diagram showing a clock adjustment operation of the embodiment when transferring data from a PC to a telephone network; and FIG. 3 is a diagram showing a clock adjustment operation of the embodiment when transferring data from the telephone network to the PC.

DESCRIPTION OF THE PREFERRED EMBODIMENT

Figure 1:
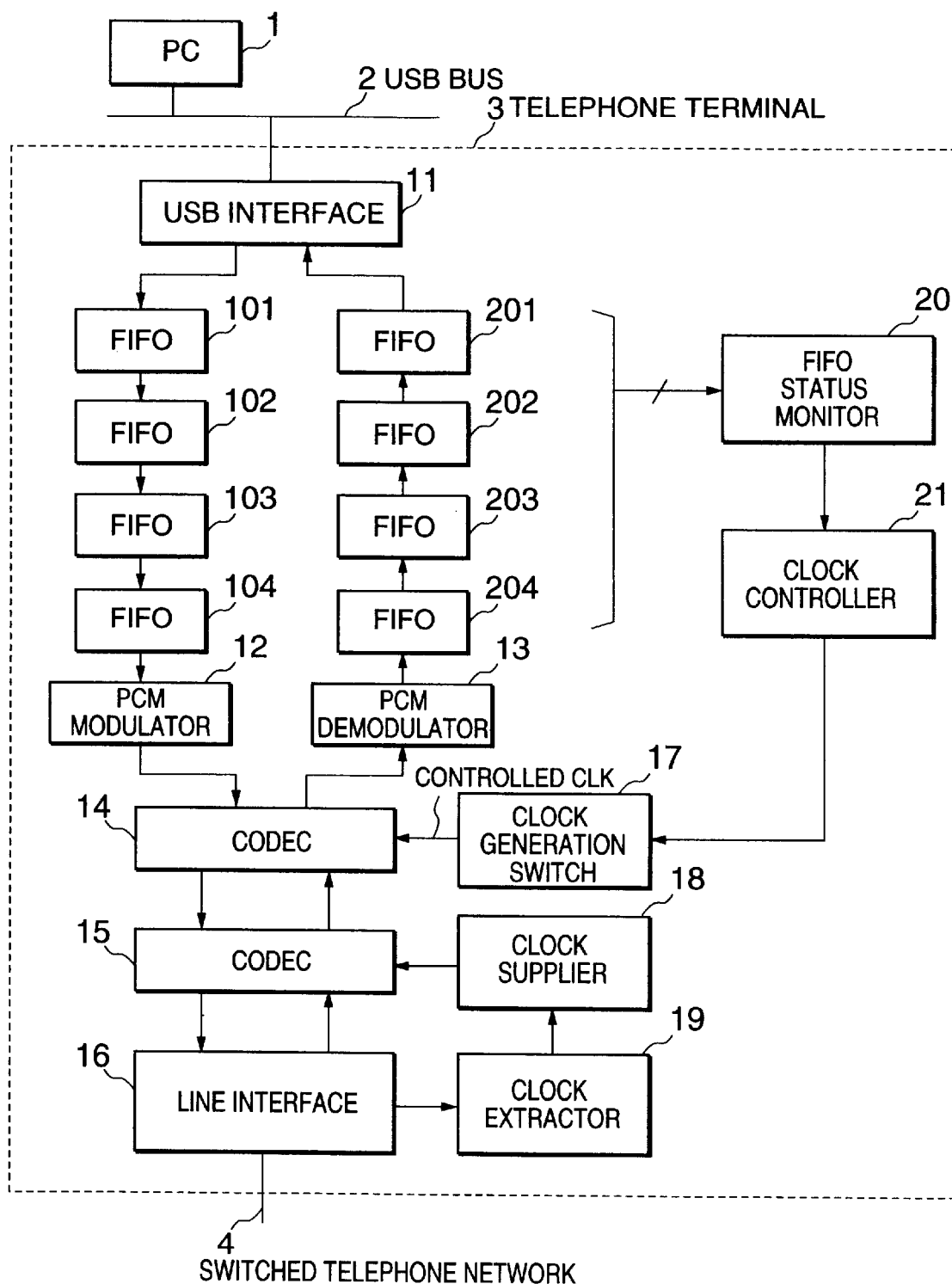
FIG. 1 is a block diagram showing the configuration of a clock adjustment apparatus according to an embodiment of the present invention.

Referring to FIG. 1, a personal computer (PC) 1 and a telephone terminal 3 are connected via a USB bus 2. The telephone terminal 3 includes a clock adjustment apparatus according to an embodiment of the present invention and is connected to a switched telephone network 4.

The telephone terminal 3 is provided with a USB interface 11 allowing isochronous communication with the PC 1 through the USB bus 2. Here, it is assumed that the USB bus 2 allows 16-byte voice data to be transferred for each frame of 1 msec in the isochronous mode. The output terminal of the USB interface 11 is connected to a PCM (pulse code modulation) modulator 12 through a FIFO (first-in first-out) memory section 101–104. The input terminal of the USB interface 11 is connected to a PCM demodulator 13 through a FIFO memory section 201–204.

Each FIFO memory section may be composed of a single FIFO memory or a plurality of FIFO memories connected in series. Here, the FIFO memory section between the USB interface 11 and the PCM modulator 12 is composed of 16-byte FIFO memories 101–104 and the FIFO memory section between the USB interface 11 and the PCM demodulator 13 is composed of 16-byte FIFO memories 201–204.

As described later, when 16-byte transmission voice data enters the FIFO memory section 101–104 for the first time, the transmission voice data is sequentially transferred through the FIFO memories 101–103 and stored in the FIFO memory 104. In this manner, transmission voice data is sequentially stored in the FIFO memory section starting from the FIFO memory 104.

Contrarily, when 16-byte reception voice data enters the FIFO memory section 201–204 for the first time, the reception voice data is sequentially transferred through the FIFO memories 204–202 and stored in the FIFO memory 201. In this manner, reception voice data is sequentially stored in the FIFO memory section starting from the FIFO memory 201.

The PCM modulator 12 and PCM demodulator 13 are connected to a USB-side coder/decoder (CODEC) 14, which is connected to a line-side CODEC 15. The line-side CODEC 15 is connected to the switched telephone network 4 via a line interface 16. Here, it is assumed that the line interface 16 transmits and receives an 8-bit PCM signal for each frame of 125 μsec to and from the switched telephone network 4.

The USB-side CODEC 14 receives a transmission PCM signal from the PCM modulator 12 and converts it into a transmission analog signal. The line-side CODEC 15 receives the transmission analog signal from the USB-side CODEC 14 and converts it into a line-transmission PCM signal to be transmitted to the switched telephone network 4. When receiving a reception PCM signal from the line interface 16, the line-side CODEC 15 converts it into a reception analog signal. The USB-side CODEC 14 receives the reception analog signal from the line-side CODEC 15 to convert it into a USB-reception PCM signal and outputs it to the PCM demodulator 13.

The USB-side CODEC 14 converts a transmission PCM signal into analog according to a controlled clock signal supplied from a clock generation switch 17. The line-side CODEC 15 converts the transmission analog signal into digital according to an operation clock signal supplied from a clock supplier 18 connected to a clock extractor 19. The clock extractor 19 is connected to the line interface 16 to extract a line clock signal from the switched telephone network 4. The clock supplier 18 produces the operation clock signal from the line clock signal to operate the line-side CODEC 15. In this manner, clock conversion is performed such that a PCM signal is converted into an analog signal according to one clock signal and the resultant analog signal is converted into a PCM signal according to the other clock signal.

The telephone terminal 3 is further provided with a FIFO status monitor 20 that monitors the statuses of respective ones of the FIFO memory sections 101–104 and 201–204. More specifically, the FIFO status monitor 20 monitors the amount of transmission data storing in the FIFO memory section 101–104 and monitors the amount of reception data storing in the FIFO memory section 201–204. For example, each of the FIFO memories 101–104 and 201–204 outputs a full-status signal to the FIFO status monitor 20 when the FIFO memory becomes full and outputs an available/empty-status signal until the FIFO memory is full. The details will be described later (see FIGS. 2 and 3).

The FIFO status monitor 20 outputs a FIFO status signal to a clock controller 21, which controls the clock generation switch 17 depending on the FIFO status so that an appropriate clock frequency is supplied to the USB-side CODEC 14. Hereafter, a clock adjustment operation according to the present embodiment will be described in detail.

Clock Adjustment

Referring to FIG. 2, each of the 16-byte FIFO memories 101–104 outputs a full-status signal to the FIFO status monitor 20 when the FIFO memory has stored 16-byte transmission voice data for each frame and outputs an empty-status signal when the FIFO memory stores no data. Here, the FIFO status monitor 20 outputs one of four FIFO status signals to the clock controller 21 depending on the amount of transmission voice data stored in the FIFO memories 101–104.

As shown in FIG. 2. when the FIFO memories 103 and 104 are full and the remaining FIFO memories 102 and 101 are empty, the clock controller 21 controls the clock generation switch 17 so that a normal-frequency (normal-speed) clock signal is supplied to the USB-side CODEC 14. Here, the period of the normal-frequency clock is 125 μsec. In other words, the clock generation switch 17 supplies the USB-side CODEC 14 with a frame pulse signal having a period of 125 μsec.

When only the FIFO memory 104 is full and the remaining FIFO memories 101–103 are empty, it means that the frequency of the PC-side clock is lower than that of the controlled clock generated by the clock generation switch 17. Accordingly, the clock controller 21 controls the clock generation switch 17 so that a lower-frequency (lower-speed) clock signal with respect to the normal-frequency clock signal is supplied to the USB-side CODEC 14 to increase the amount of data stored in the FIFO memory section. When the amount of data stored in the FIFO memory section becomes normal, the clock controller 21 controls the clock generation switch 17 so that a normal-frequency (normal-speed) clock signal is supplied to the USB-side CODEC 14.

The lower frequency is lower than the normal frequency by an amount within a permissible frame clock error of ±5% which may occur in the USB interface 11 and the PC clock can accommodate. For example, the lower-frequency clock signal has a period of 132 μsec. In other words, the clock generation switch 17 switches the period of a frame pulse signal supplied to the USB-side CODEC 14 from 125 μsec to 132 μsec.

When the FIFO memories 102–104 are full and only the FIFO memory 101 is empty, which is caused by frame pulse jitter on the USB bus 2 and/or by the frequency of the PC-side clock higher than that of the controlled clock generated by the clock generation switch 17. Accordingly, the clock controller 21 controls the clock generation switch 17 so that a higher-frequency (higher-speed) clock signal with respect to the normal-frequency clock signal is supplied to the USB-side CODEC 14 to decrease the amount of data stored in the FIFO memory section. When the amount of data stored in the FIFO memory section becomes normal, the clock controller 21 controls the clock generation switch 17 so that a normal-frequency (normal-speed) clock signal is supplied to the USB-side CODEC 14.

The higher frequency is higher than the normal frequency by an amount within a permissible frame clock error of ±5% which may occur in the USB interface 11 and the PC clock can accommodate. For example, the higher-frequency clock signal has a period of 117 μsec. In other words, the clock generation switch 17 switches the period of a frame pulse signal supplied to the USB-side CODEC 14 from 125 μsec to 117 μsec.

When the PC 1 starts data transmission in the isochronous mode, transmission voice data sequentially store into the FIFO memories 101–104 as described before. When the FIFO memories 104 and 103 become full, the clock generation switch 17 starts supplying the normal-frequency clock signal to the USB-side CODEC 14 under control of the clock controller 21 as described before. If the transmission voice data are stored In the FIFO memories 104 to 102, the clock controller 21 switches the normal-frequency clock signal to the higher-frequency clock signal. Contrarily, when the FIFO memories 101–103 become empty, the clock controller 21 switches the normal-frequency clock signal to the lower-frequency clock signal.

Referring to FIG. 3, each of the 16-byte FIFO memories 201–204 outputs a full-status signal to the FIFO status monitor 20 when the FIFO memory has stored 16-byte reception voice data for each frame and outputs an empty-status signal when the FIFO memory stores no data. Here, the FIFO status monitor 20 outputs one of four FIFO status signals to the clock controller 21 depending on the amount of reception voice data stored in the FIFO memories 201–204.

As shown in FIG. 3, when the FIFO memories 201 and 202 are full and the remaining FIFO memories 203 and 204 are empty, the clock controller 21 controls the clock generation switch 17 so that a normal-frequency (normal-speed) clock signal is supplied to the USB-side CODEC 14. Here, the period of the normal-frequency clock is 125 μsec. In other words, the clock generation switch 17 supplies the USB-side CODEC 14 with a frame pulse signal having a period of 125 μsec.

When only the FIFO memory 201 is full and the remaining FIFO memories 202–204 are empty, it means that the frequency of the PC-side clock is higher than that of the controlled clock generated by the clock generation switch 17. Accordingly, the clock controller 21 controls the clock generation switch 17 so that a higher-frequency (higher-speed) clock signal with respect to the normal-frequency clock signal is supplied to the USB-side CODEC 14 to increase the amount of data stored in the FIFO memory section. When the amount of data stored in the FIFO memory section becomes normal, the clock controller 21 controls the clock generation switch 17 so that a normal-frequency (normal-speed) clock signal is supplied to the USB-side CODEC 14.

As described before, the higher frequency is higher than the normal frequency by an amount within a permissible frame clock error of ±5% which may occur in the USB interface 11 and the PC clock can accommodate. Here, the higher-frequency clock signal has a period of 117 μsec.

When the FIFO memories 201–203 are full and only the FIFO memory 204 is empty, it means that the frequency of the PC-side clock is lower than that of the controlled clock generated by the clock generation switch 17. Accordingly, the clock controller 21 controls the clock generation switch 17 so that a lower-frequency (lower-speed) clock signal with respect to the normal-frequency clock signal is supplied to the USB-side CODEC 14 to decrease the amount of data stored in the FIFO memory section. When the amount of data stored in the FIFO memory section becomes normal, the clock controller 21 controls the clock generation switch 17 so that a normal-frequency (normal-speed) clock signal is supplied to the USB-side CODEC 14.

The lower frequency is lower than the normal frequency by an amount within a permissible frame clock error of ±5% which may occur in the USB interface 11 and the PC clock can accommodate. Here, the lower-frequency clock signal has a period of 132 μsec.

When the line-side CODEC 15 starts operating in response to reception of data from the switched telephone network 4, the clock generation switch 17 starts supplying the USB-side CODEC 14 with the normal-frequency clock signal. Accordingly, reception voice data sequentially store into the FIFO memories 201–204 as described before. When the FIFO memories 201 and 202 become full, the USB interface 11 starts sequentially transferring the stored voice data to the PC 1 through the USB bus 2 in the isochronous mode. When the reception voice data are stored in the FIFO memories 201 to 203, the clock controller 21 switches the normal-frequency clock signal to the lower-frequency clock signal. Contrarily, when the FIFO memories 202–204 become empty, the clock controller 21 switches the normal-frequency clock signal to the higher-frequency clock signal.

As described above, data transmission and reception can be performed by the telephone terminal 3 according to the clock adjustment operations as shown in FIGS. 2 and 3, respectively. Accordingly, even in the case where the PC clock is not synchronized to the line clock of the switched telephone network 4, the clock adjustment allows continuous voice data transmission without data slip or noise, resulting in improved stability and reliability on voice data communication.

In the above embodiment, the FIFO memory section is composed of a plurality of FIFO memories connected in series. It is also possible to use a single FIFO memory having a necessary capacity.

What is claimed is:

1. An apparatus connecting a first network and a second network to transfer data between them, wherein the first and second networks operate at different clock frequencies, respectively, comprising:

a first interface to the first network;

a second interface to the second network;

a buffer memory connected to the first interface, for storing data to be transferred to one of the first and second networks;

a clock converter connected between the buffer memory and the second interface, performing a clock conversion according to a controlled clock signal corresponding to the first network and an extracted clock signal that is extracted from the second network;

a buffer monitor for monitoring an amount of data stored in the buffer memory to produce a buffer status signal; and a clock adjuster for adjusting the controlled clock signal depending on the buffer status signal.

2. The apparatus according to claim 1, wherein the clock adjuster changes a frequency of the controlled clock signal so that the amount of data stored in the buffer memory is kept at a predetermined level.

3. The apparatus according to claim 2, wherein the clock adjuster changes a frequency of the controlled clock signal by an amount within a permissible frame clock error which may occur in the first interface.

4. An apparatus connecting a personal computer and a switched telephone network to transfer digital data between them, comprising:

a USB (universal serial bus) interface to a USB bus connected to the personal computer;

a network interface to the switched network;

a transmission buffer memory for storing transmission digital voice data that the personal computer transmits;

a reception buffer memory for storing reception digital voice data received from the switched telephone network via the network interface;

a PCM (pulse-code modulation) modulator for modulating the transmission digital voice data to produce a transmission PCM signal;

a PCM demodulator for demodulating a reception PCM signal to produce the reception digital voice data;

a transmission clock converter connecting the PCM modulator to the network interface, performing a clock conversion according to a controlled clock signal corresponding to the USB interface and an extracted clock signal that is extracted from the second network;

a reception clock converter connecting the network interface to the PCM demodulator, performing a clock conversion according to the controlled clock signal and the extracted clock signal;

a buffer monitor for monitoring an amount of data stored in each of the transmission and reception buffer memories to produce a buffer status signal; and a clock switching controller for switching a frequency of the controlled clock signal to one selected from a plurality of predetermined frequencies depending on the buffer status signal.

5. The apparatus according to claim 4, wherein the clock switching controller switches a frequency of the controlled clock signal so that the amount of data stored in the buffer memory is kept at a predetermined level.

6. The apparatus according to claim 5, wherein the plurality of predetermined frequencies are a normal frequency, a lower frequency, and a higher frequency, wherein a difference between each of the lower and higher frequencies and the normal frequency falls into a range within a permissible frame clock error which may occur in the USB interface.

7. The apparatus according to claim 6, wherein the permissible frame clock error is 5% of a normal frame clock of the USB bus.

8. The apparatus according to claim 4, wherein the transmission clock converter comprises:
a first coder for coding the transmission PCM signal to produce a transmission analog voice signal according to the controlled clock signal; and
a first decoder for decoding the transmission analog voice signal to produce network-side transmission PCM signal according to the extracted clock signal, and the reception clock converter comprises:
a second coder for coding network-side reception PCM signal to produce a network-side reception analog voice signal according to the extracted clock signal; and
a second decoder for decoding the network-side reception analog voice signal to produce the reception PCM signal according to the controlled clock signal.

9. The apparatus according to claim 4, wherein the digital voice data is transferred through the USB bus in an isochronous mode.

10. The apparatus according to claim 4, wherein the transmission buffer memory and the reception buffer memory are FIFO (first-in-first-out) memories, respectively.

11. The apparatus according to claim 10, wherein the transmission buffer memory comprises a plurality of FIFO memories and the reception buffer memory comprises a plurality of FIFO memories.

12. A control method for a telephone terminal connecting a personal computer and a switched telephone network to transfer voice data between them, comprising:

storing digital voice data to be transferred to one of the personal computer and the switched telephone network in a buffer memory;

monitoring an amount of data stored in the buffer memory to produce a buffer status signal;

adjusting a frequency of a controlled clock signal corresponding to the personal computer depending on the buffer status signal;

extracting an extracted clock signal from the switched telephone network; and converting an operation clock between the personal computer and the switched telephone network according to the controlled clock signal and the extracted clock signal.

13. The method according to claim 12, wherein the frequency of the controlled clock signal is changed so that the amount of data stored in the buffer memory is kept at a predetermined level.

14. The method according to claim 13, wherein a change of frequency of the controlled clock signal falls into a permissible frame clock error which may occur in a connection bus to the personal computer.

15. A telephone terminal apparatus connecting a personal computer and a switched telephone network to transfer digital voice data between them, comprising:

a USB (universal serial bus) interface to a USB bus connected to the personal computer; and a line interface coupled between the USB interface and the switched telephone network, wherein an isochronous mode is used in connecting the telephone terminal apparatus to the personal computer.

16. The telephone terminal apparatus according to claim 15, further comprising;

a buffer memory connected to the USB interface, for storing digital voice data to be transferred to one of the personal computer and the switched telephone networks;

a clock converter connected between the buffer memory and the line interface, performing a clock conversion according to a controlled clock signal corresponding to the USB interface and an extracted clock signal that is extracted from the switched telephone network;

a buffer monitor for monitoring an amount of data stored in the buffer memory to produce a buffer status signal; and a clock adjuster for adjusting the controlled clock signal depending on the buffer status signal.

17. A connecting apparatus for transferring data between a first and second network, comprising:

a first interface to the first network;

a second interface to the second network;

a buffer memory connected to the first interface for storing data to be transferred to one of the first network and the second network; and a clock converter connected between the buffer memory and the second interface, wherein said clock converter performs a clock conversion according to a controlled clock signal corresponding to the first network and an extracted clock signal from the second network.

18. The connecting apparatus as claimed in claim 17, further comprising:

a buffer monitor connected to said buffer memory for monitoring an amount of data stored in the buffer memory, said buffer monitor outputting a buffer status signal; and a clock adjuster for adjusting a controlled clock signal depending on the buffer status signal.

19. The connecting apparatus as claimed in claim 17, wherein the first and second networks operate at different clock frequencies, respectively.

20. A method for controlling a data transfer terminal connecting a computer and a switched telephone network, comprising:

storing data to be transferred to one of the computer and the switched telephone network in a buffer memory;

monitoring an amount of data stored in the buffer memory to produce a buffer status signal; and adjusting a frequency of a controlled clock signal corresponding to the computer depending on the buffer status signal.

21. The method as claimed in claim 20, further comprising:

extracting an extracted clock signal from the switched telephone network; and converting an operation clock between the computer and the switched telephone network according to the controlled clock signal and the extracted clock signal.

22. The method as claimed in claim 20, wherein the frequency of the controlled clock signal is adjusted to maintain an amount of data stored in the buffer memory at a predetermined level.

* * * * *